(12) United States Patent
Nishijima et al.

(10) Patent No.: US 8,240,166 B2
(45) Date of Patent: Aug. 14, 2012

(54) COOLING SYSTEM AND ELECTRONIC EQUIPMENT INCLUDING COOLING SYSTEM

(75) Inventors: Noriyo Nishijima, Abiko (JP); Shigeo Ohashi, Tsuchiura (JP); Nariaki Shigyo, Yokohama (JP); Tatsuo Morita, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 643 days.

(21) Appl. No.: 12/430,153

(22) Filed: Apr. 27, 2009

(65) Prior Publication Data

US 2009/0266098 A1 Oct. 29, 2009

(30) Foreign Application Priority Data

Apr. 28, 2008 (JP) ................. 2008-116563

(51) Int. Cl.
*F25D 23/12* (2006.01)
(52) U.S. Cl. .................................... 62/259.2
(58) Field of Classification Search ............... 62/259.2, 62/324.1
See application file for complete search history.

(56) References Cited

U.S. PATENT DOCUMENTS

| | | | |
|---|---|---|---|
| 6,748,758 B2 * | 6/2004 | Imada et al. | 62/259.2 |
| 2005/0088820 A1 * | 4/2005 | Naganawa et al. | 361/697 |
| 2006/0026970 A1 | 2/2006 | Tilton | |

FOREIGN PATENT DOCUMENTS

| | | |
|---|---|---|
| JP | 61-110453 | 5/1986 |
| JP | 5-113252 | 5/1993 |
| JP | 2001-168567 | 6/2001 |
| JP | 2001-255027 | 9/2001 |
| JP | 2005-064186 | 3/2005 |
| JP | 2007-041413 | 2/2007 |
| JP | 2008-509563 | 3/2008 |
| WO | WO 2006/017817 | 2/2006 |

* cited by examiner

*Primary Examiner* — Melvin Jones
(74) *Attorney, Agent, or Firm* — Antonelli, Terry, Stout & Kraus, LLP.

(57) ABSTRACT

An electronic equipment includes a cooling system using boiling and condensation of a refrigerant, especially stabilizes the cooling performance, and reduces the influence which vibration accompanying phase change of boiling and condensation gives to the electronic equipment. Electronic equipment includes a cooling system including a cooling part which cools heat generating from a heat generator such as a heat generating component by using boiling of a refrigerant and is thermally connected to the heat generator such as the heat generating element, a heat radiation part which radiates heat absorbed by the refrigerant in the cooling part by condensation, a refrigerant drive part for delivering the condensed refrigerant to the cooling part again, and piping which fluidly connects them, and the electronic equipment includes preliminary heating means for heating the refrigerant, which flows to the cooling part from the refrigerant drive part, between the refrigerant drive part and the cooling part.

9 Claims, 8 Drawing Sheets

WHITE: WITH PRELIMINARY HEATING MEANS
BLACK: WITHOUT PRELIMINARY HEATING MEANS

| ITEM | SPECIFICATIONS |
| --- | --- |
| REFRIGERANT | CFC SUBSTITUTE |
| REFRIGERANT FLOW RATE | 20~50mL / min |
| CONDENSER | CORRUGATED FIN TYPE |
| FAN | AIR FLOW RATE 0.4m³/min |
| PRELIMINARY HEATING PART HEAT GENERATION AMOUNT | 14W |

COOLING SYSTEM AND ELECTRONIC EQUIPMENT INCLUDING COOLING SYSTEM

BACKGROUND OF THE INVENTION

The present invention relates to a cooling system using boiling and condensation of a refrigerant, and electronic equipment including the cooling system.

As a conventional art of cooling a heat-generating component inside electronic equipment, there is known a so-called liquid-cooling type cooling device which transfers heat generating from a heat-generating component such as, for example, a CPU to a liquid medium, and transmits the liquid medium to a heat radiation part by a pump to release the heat. The conventional art of the liquid-cooling type cooling device includes JP-A-2005-64186, JP-A-2007-41413 and the like.

JP-A-2005-64186 is intended for a computer, whereas JP-A-2007-41413 is intended for a liquid crystal projector. The above described liquid-cooling type is configured by a cooling part for transmitting heat to a liquid from a heat-generating component, a heat radiation part which radiates heat from the liquid, and a pump which circulates the liquid between the cooling part and the heat radiation part.

BRIEF SUMMARY OF THE INVENTION

In the liquid-cooling methods shown in these documents, an antifreeze liquid such as ethylene glycol is mainly used as a liquid, and the liquid is always in a single-phase flow state when the liquid circulates in the cooling system. Accordingly, the liquid which absorbs heat in the cooling part has a high temperature and is transported to the heat radiation part by the pump, and is cooled to a low temperature in the heat radiation part. Specifically, the generated heat from the heat-generating component is transmitted to the heat radiation part as a change in the liquid temperature.

In contrast with this, in the cooling method similarly configured by the cooling part, the heat radiation part and the pump for circulating the liquid, a method is conceivable which transmits heat by using boiling and condensation of a refrigerant by using a liquid with a relatively low boiling point (hereinafter, called a refrigerant) as an antifreeze liquid. Specifically, by boiling the refrigerant in the cooling part, the refrigerant is changed in phase from a liquid phase to a vapor phase, and the refrigerant is caused to absorb the heat generated in the heat-generating component in a form of latent heat of vaporization.

The refrigerant which absorbs heat and becomes vapor is transported to the heat radiation part, and releases heat as latent heat of condensation in the heat radiation part, and returns to a liquid phase again. The refrigerant which is in a liquid phase is transported to a cooling part again by liquid drive means such as a pump. Specifically, the generated heat from the heat generating component is transmitted to the heat radiation part as latent heat by phase change (hereinafter, the cooling method by boiling and condensation will be called a phase change cooling method).

In the phase change cooling method, the heat transmission amount per unit liquid amount is very large due to use of latent heat, and as compared with the case of using single-phase flow, the liquid flow rate necessary for cooling can be significantly reduced. Therefore, the pump is reduced in size, and the cooling system and the electronic equipment including the cooling system can be made compact.

However, the phase change cooling method has the problems described as follows.

Firstly, stable cooling performance is not obtained since it is difficult to cause stable boiling in the cooling part. Therefore, when applied to cooling of electronic equipment, there is the fear that the component is exposed to a high temperature as a result that boiling does not occurs, depending on the operation state of the component which is the heat generator. Especially, when the heat generation amount of the heat generator varies, the boiling state easily becomes unstable.

Secondly, since the volume of the refrigerant significantly changes due to change to the vapor phase from the liquid phase, this becomes the vibration generating source, and vibration is caused to the heat generator such as an electronic component which is thermally connected to the cooling part. Especially when bumping locally occurs at the time of transfer to the boiling state from the single-phase state, vibration is easily caused.

An object of the present invention is to provide a cooling system which realizes phase change cooling including stable cooling performance, performs stable cooling of a heat generating component by a phase change cooling method, and reduces influence which vibration gives to the heat generating component, and electronic equipment including the cooling system.

The above described object is achieved as a result that in a cooling system including a cooling part which cools heat generating from a heat generating element with a boiling refrigerant, a heat radiation part which thermally connects the cooling part and the aforementioned heat generating element to radiate heat absorbed by the aforementioned refrigerant by condensation, a refrigerant drive part for delivering the aforementioned refrigerant condensed in the heat radiation part to the cooling part again, and piping connecting the refrigerant drive part, the aforementioned cooling part and the aforementioned heat radiation part, heating means for heating the refrigerant, which flows to the aforementioned cooling part from the aforementioned refrigerant drive part, is included between the aforementioned refrigerant drive part and the aforementioned cooling part.

Further, the above described object is achieved as a result that the aforementioned heating means is variable in a heating amount, and heat control means, which controls the heating amount by the aforementioned heating means in accordance with an operation state of the aforementioned heat generator which is thermally connected to the aforementioned cooling part, is included.

Further, the above described object is achieved as a result that the aforementioned heating means temporarily increases the heating amount at a time of start of electronic equipment.

Further, the above described object is achieved as a result that the electronic equipment is a projective type image projector including a video display element unit constituted of a light source and at least one video display element accompanied by heat generation by modulation, reflection, absorption and the like of light, the aforementioned video element unit is thermally connected to the aforementioned cooling part, and the aforementioned video display unit is cooled.

The above described object is achieved as a result that the electronic equipment is a computer having a CPU that performs arithmetic processing and a chip set, which are mounted on a mother board, the aforementioned CPU is thermally connected to the aforementioned cooling part, and the aforementioned CPU is cooled.

Further, the above described object is achieved as a result that in a cooling system including a cooling part which cools heat generating from a heat generating element with a boiling refrigerant, a heat radiation part which thermally connects the cooling part and the aforementioned heat generating element to radiate heat absorbed by the aforementioned refrigerant by condensation, a refrigerant drive part for delivering the aforementioned refrigerant condensed in the heat radiation part to the cooling part again, and piping connecting the refrigerant drive part, the aforementioned cooling part and the aforementioned heat radiation part, the aforementioned cooling part is provided in each of at least two spots to be thermally connected to each of a plurality of heat generating elements, and heating means for heating the refrigerant which flows to the aforementioned cooling part from the aforementioned refrigerant drive part is included between the aforementioned refrigerant drive part and the aforementioned cooling part.

Further, the above described object is achieved as a result that a heat generator of which allowable operation temperature is relatively low among the aforementioned plurality of heat generators which are thermally connected to the aforementioned plurality of cooling parts is thermally connected to at least the second cooling part or the one thereafter when the aforementioned plurality of cooling parts are put in order in accordance with a delivery direction of the refrigerant starting from the aforementioned refrigerant drive part.

Further, the above described object is achieved as a result that electronic equipment is a projective type image projector including a power supply unit for supplying a voltage and a current to an electronic component, and at least one video display element unit accompanied by heat generation by modulation, reflection, absorption and the like of light of a light source, one of the aforementioned plurality of cooling parts is the aforementioned display element unit, one of the remaining cooling parts is thermally connected to any of the aforementioned light source or the aforementioned power supply unit, and the aforementioned display element unit and the aforementioned light source or the aforementioned power supply are cooled.

Further, the above described object is achieved as a result that the aforementioned video display element unit is thermally connected to at least the second cooling part or thereafter when the aforementioned plurality of cooling parts are put in order in accordance with a delivery direction of the refrigerant starting from the aforementioned refrigerant drive part, and the aforementioned video display element unit is cooled.

Further, the above described object is achieved as a result that in a computer having a power supply unit for supplying a predetermined voltage and current to an electronic component, and a CPU performing arithmetic processing and a chip set which are mounted on a mother board, the aforementioned CPU is thermally connected to at least the second cooling part or thereafter when the aforementioned plurality of cooling parts are put in order in accordance with the delivery direction of the refrigerant starting from the aforementioned refrigerant drive part, and the aforementioned CPU is cooled.

According to the present invention, electronic equipment including stable cooling performance with influence of vibration occurring due to phase change being reduced can be provided.

Other objects, features and advantages of the invention will become apparent from the following description of the embodiments of the invention taken in conjunction with the accompanying drawings.

DETAILED DESCRIPTION OF THE INVENTION

Hereinafter, one embodiment will be described with reference to FIGS. 1 to 8.

Embodiment 1

The electronic equipment in the present embodiment is a projective type liquid crystal projector including a video display element unit configured by a light source, a liquid crystal panel, a polarizing element and the like.

Figure 1:
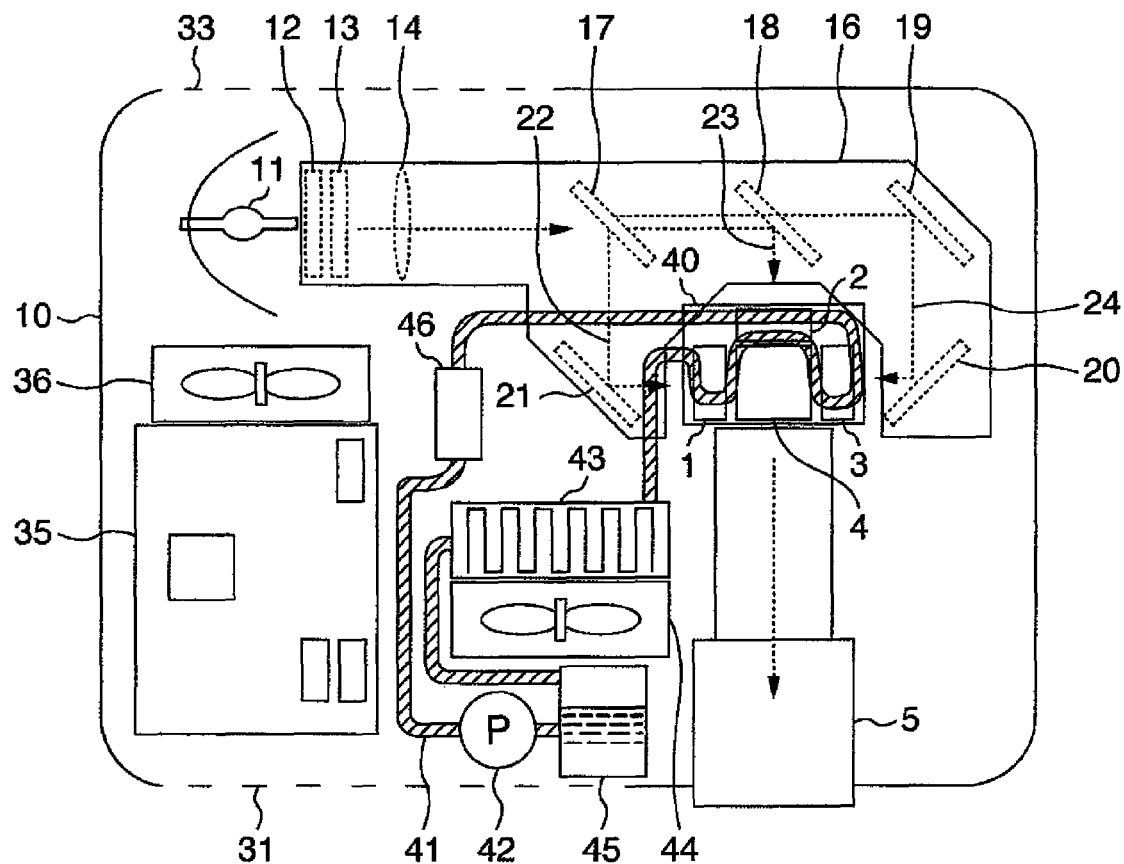
FIG. 1 is a schematic configuration diagram of a projective type video projector according to one embodiment of the present invention.

FIG. 1 is a schematic configuration diagram of a projective type liquid crystal projector in the present embodiment seen from above.

In FIG. 1, a liquid source lamp 11 for generating light is provided inside a casing 10. White light which generates from the liquid source lamp 11 passes through a lens array 12, a polarization converting element 13, and a light gathering lens 14 and has light quantity uniformed to be polarized light with an optical axis substantially aligned, and is decomposed into a red light 22, a green light 23 and a blue light 24 by dichroic mirrors 17 and 18 and total reflection mirrors 19, 20 and 21. The decomposed lights of three colors are incident on the video display element unit configured by a red light liquid crystal panel module 1, a green light liquid crystal panel module 2, a blue light liquid crystal panel module 3 and a prism 4 from different directions respectively.

In order to prevent stray light and adhesion of dust, the optical components such as the lens array 12 and the dichroic mirrors 17 and 18 are disposed in an optical component cover 16. The three colors which transmit through the liquid crystal panel modules 1 to 3 (red, green and blue) are combined by the prism 4, transmit through a projective lens 5 to be a desired image and projected, and a projected image is expressed on a screen not illustrated. A power supply unit 35 for supplying electric power to the component such as the light source lamp 11, and a fan 36 for cooling the power supply unit 35 and the light source lamp 11 are provided inside the casing 10. By operation of the fan 36, air enters from an intake port 31 provided in the casing 10, the power supply unit 35 and the light source lamp 11 are cooled by air which flows in, and the air is exhausted from an exhaust port 33. Though not illustrated, a control board (not illustrated) including a control circuit which takes in a video signal from outside and controls operation of the liquid crystal panel modules, the fan and the like is provided inside the casing 10. The control board is disposed in a clearance between, for example, the video display element unit and a top surface of the casing.

The video display element unit configured by the red light liquid crystal panel module 1, the green light liquid crystal panel module 2, the blue light liquid crystal panel module 3 and the prism 4 is cooled by a phase change cooling system. The phase change cooling system is configured by a heat radiation part 40 which is provided on a portion under the red light liquid crystal panel module 1, the green light liquid crystal panel module 2, the blue light liquid crystal panel module 3 and the prism 4, a refrigerant piping 41 which circulates the refrigerant and is shown by the oblique line in the drawing, a refrigerant drive part which is constituted of a pump 42 for circulating the refrigerant, a heat radiation part constituted of a condenser 43 for condensing steam generated in the cooling part, and a fan 44, a vapor-liquid separating part 45 for separating vapor and a liquid and preventing vapor from entering the pump 42, and a preliminary heating part 46 provided between the refrigerant drive part constituted of the pump 42 and the cooling part.

By operation of the pump 42, the refrigerant passes through the preliminary heating part 46, the heat radiation part 40, the condenser 43 and the vapor-liquid separating part 45 in sequence from the pump, and is circulated by the pump. Further, by operation of the fan 44, air flows in from the intake port 31, flows while cooling the pump 42 and the vapor-liquid separating part 45, and cools the condenser 43 to be exhausted from the exhaust port 33. Specifically, the pump 42 and the vapor-liquid separating part 45 are disposed at an upstream side from the condensing part seen from the flow of the cooling air.

With use of FIGS. 2 to 4, the configuration of the video display element unit and its periphery will be described.

Figure 2:
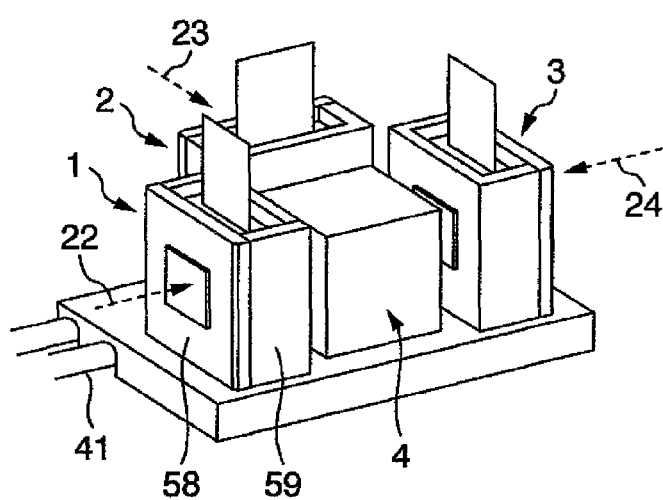
FIG. 2 is a perspective view of a video display element unit according to one embodiment.
Figure 3:
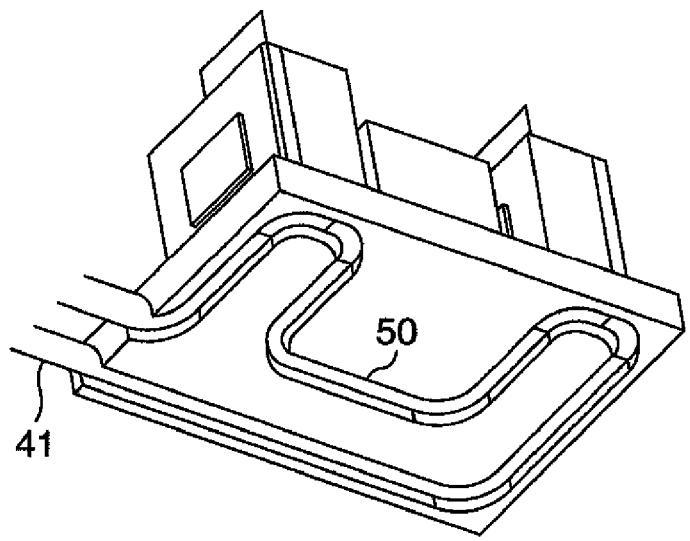
FIG. 3 is a perspective view of the video display element unit according to one embodiment.

FIGS. 2 and 3 are perspective views of the video display element unit and its periphery.

In FIGS. 2 and 3, the video display element unit configured by the red light liquid crystal panel module 1, the green light liquid crystal panel module 2, the blue light liquid crystal panel module 3 and the prism 4 is installed on the heat radiation part 40 shown in FIG. 1 by being thermally connected to the heat radiation part 40.

In the present invention, being thermally connected means that solid bodies are in contact with each other, or a relatively soft material such as a resin and grease is charged to fill the gap between the solid bodies, or means that a flexible sheet or the like is inserted to fill the gap between the solid bodies.

The refrigerant piping is buried in a groove 50 provided on a back side of the heat radiation part 40 as shown in FIG. 3. In the present embodiment, in the heat radiation part 40, the refrigerant piping is buried in the groove, but, for example, a flow path in which the refrigerant flows may be formed inside the heat radiation part 40 itself.

Figure 4:
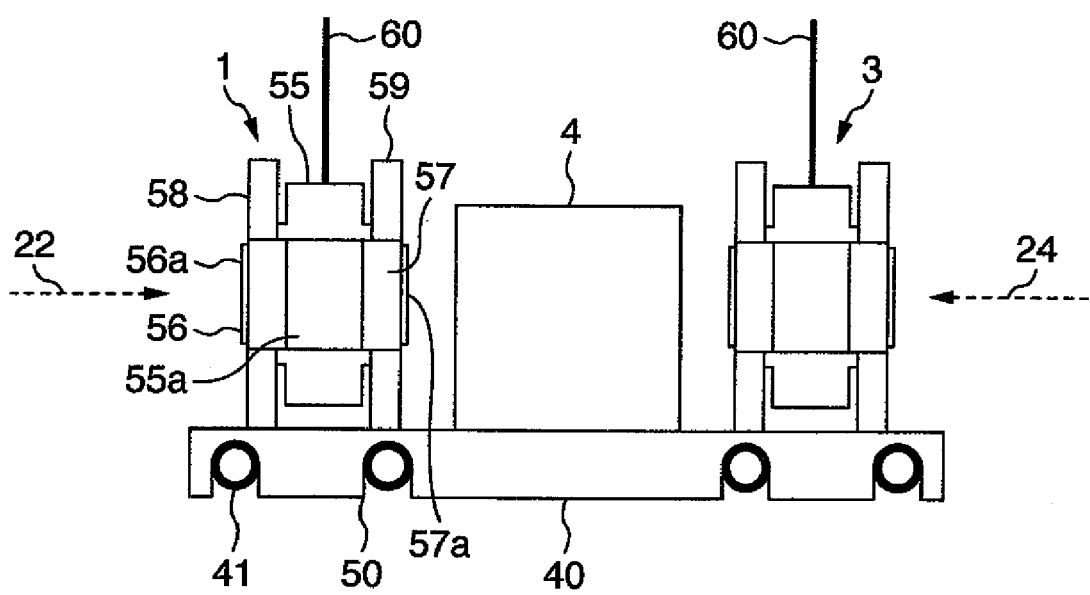
FIG. 4 is a sectional view showing a structure of the video display element unit according to one embodiment.

FIG. 4 is a sectional view which passes through the red light liquid crystal panel module, the prism and the blue light liquid crystal panel module.

In FIG. 4, the liquid crystal panel modules of three colors have the same configurations, and therefore, the internal configuration will be described by using the red light liquid crystal panel module 1. The liquid crystal panel module is configured by a liquid crystal panel 55, an incident polarizing plate 56 and a radiant polarizing plate 57 which are disposed in front of and behind the liquid crystal panel 55, an incident side frame 58 holding and thermally connected to the incident polarizing plate 56, and an radiant side frame 59 holding and thermally connected to the radiant polarizing plate 57. The liquid crystal panel 55 is connected to a control board (not illustrated) by a flexible connector 60. Further, an incident polarizing film 56*a* is bonded onto the incident polarizing plate 56, and a radiant polarizing film 57*b* is bonded onto the radiant polarizing plate 57, respectively. Both sides of a light transmitting part 55*a* of the liquid crystal panel 55 are thermally connected to the incident polarizing plate 56 and the radiant polarizing plate 57 respectively. The liquid crystal panel includes therein a number of light valve elements configuring pixels, and changes the polarizing state of transmitted light for each pixel.

The incident side polarizing film and the radiant side polarizing film are for transmitting only specific polarization components respectively, and by controlling the light valve elements with the control board by combining the incident side polarizing film, the liquid crystal panel and the radiant side polarizing film, a desired image can be obtained. Further, heat which generates in the incident polarizing film, the liquid crystal panel and the radiant polarizing film, is transmitted to the incident polarizing plate 56 and the radiant polarizing plate 57 by thermal conduction, after which, the heat is further transmitted through the incident side frame 58 and the radiant side frame 59 by thermal conduction, and is further transmitted to the heat radiation part 40. The heat transmitted to the heat radiation part 40 is transmitted to the refrigerant piping 41 and is transferred to the heat radiation part by the refrigerant which flows inside.

The incident polarizing plate 56 and the radiant polarizing plate 57 transmit the heat which generates in the incident polarizing film, the liquid crystal panel and the radiant polarizing film to the incident side frame and the radiant side frame, and therefore, the incident polarizing plate 56 and the radiant polarizing plate 57 need to be configured by a material favorable in thermal conduction, and have to include a light transmissive property. As the material which satisfies both of them at the same time, sapphire and quartz are cited. The incident side frame and the radiant side frame do not need to have a light transmissive property, but need to be configured by a material favorable in thermal conductivity in order to transmit heat to the heat radiation part 40, and are configured by, for example, copper, aluminum or the like.

The heat which generates in the video display element unit thus configured by the red light liquid crystal panel module 1, the green light liquid crystal panel module 2, the blue light liquid crystal panel module 3 and the prism 4 is transmitted to the refrigerant piping 41 by the heat radiation part 40 by thermal conduction.

In the present embodiment, an optical system using a light transmission type liquid crystal panel is assumed, but the present invention is also applicable to other optical systems using a reflective type liquid crystal panel (LIQUID CRYSTAL ON SILICON), and a very small movable mirror (DIGITAL MICROMIRROR DEVICE).

Further, when phase change cooling is performed for the video display element unit as in the present embodiment, cooling air does not need to be applied to the video display element unit, and therefore, the video display element unit may be covered by the method similar to the optical component cover 16. Thereby, the effect of preventing adherence of dust to the video display element unit is provided.

Next, the configuration of the phase change cooling system will be described by using FIGS. 1, 5 and 6.

Figure 5:
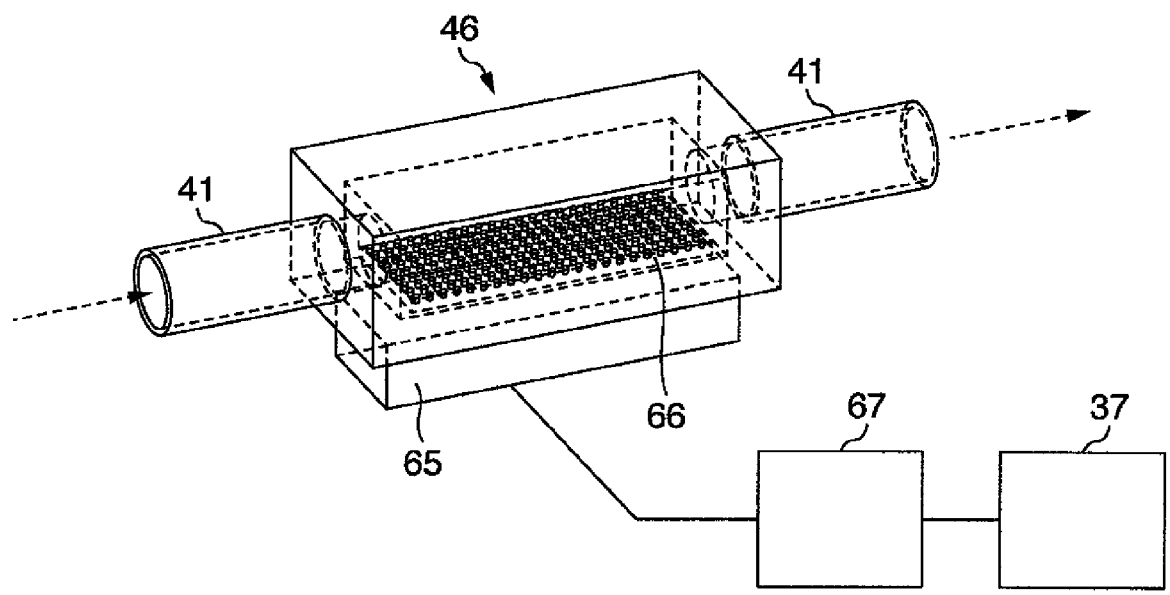
FIG. 5 is a perspective view of a preliminary heating part according to one embodiment.

FIG. 5 is a perspective view of a preliminary heating part including one embodiment of the present invention.

Figure 6:
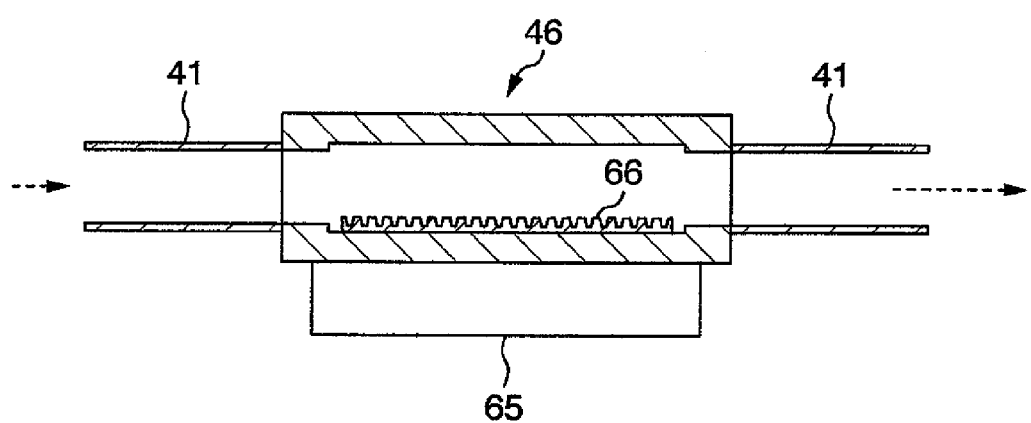
FIG. 6 is a sectional view showing a structure of the preliminary heating part according to one embodiment.

FIG. 6 is a sectional view showing a structure of the preliminary heating part including one embodiment of the present invention.

In FIGS. 1, 5 and 6, the liquid refrigerant is delivered to the preliminary heating part 46 by the pump 42 shown in FIG. 1. The configuration view of the preliminary heating part 46 is shown in FIG. 5, whereas the sectional view showing the internal structure is shown in FIG. 6, and the arrows of the dotted lines in the drawings show the flows of the refrigerant. In the preliminary heating part 46, a flow path in which the refrigerant flows is formed inside as shown in FIG. 5, and a heater 65 is provided outside. Further, boiling promoting means 66 for promoting start of boiling is provided on the flow path in which the refrigerant flows. Further, preliminary heating control means 67 for controlling a heating amount is connected to the heater 65 so as to be able to control the heating amount. Further, the preliminary heating control means 67 is connected to the above described control circuit 37 which takes in a video signal from outside, and controls the operation of the liquid crystal panel modules, fan and the like.

The liquid refrigerant which flows into the preliminary heating part 46 is heated by the heater 65, starts to boil and is brought into a two-phase flow state in which a part of it becomes vapor. The refrigerant which is brought into the two-phase state by the preliminary heating part 46 is fed to the heat radiation part 40, and further boils by receiving heat generating from the video display element unit. The refrigerant absorbs heat as the heat of vaporization when the refrigerant boils to be vapor, and is transported to the heat radiation part. By being deprived of heat by boiling, the heat radiation part 40 is cooled.

The heater 65 is controlled as follows by the preliminary heating control means 67.

First, at the time of start, the preliminary heating control means 67 receives a start signal from the control circuit 37, and causes the heater 65 to heat the preliminary heating part 46 to a high temperature. After the preliminary heating part 46 is at a high temperature required for causing boiling, the preliminary heating control means 67 decreases the heating amount of the heater 65. More specifically, the preliminary heating control means 67 receives the start signal from the control circuit 37, and performs control to increase the heating amount temporarily only at a starting time. Further, at the time of operation thereafter, the preliminary heating control means 67 receives a signal showing an image state which is displayed from the control circuit 37, and increases and decreases the heating amount while estimating the heat generation amount of the video display element unit. As described above, the video display element unit generates heat since it absorbs part of light, and the absorption amount of light changes depending on the image.

In the optical system using a transmission type liquid crystal panel as shown in the present embodiment, the heat generation amount becomes large when a black image is projected because light is blocked, whereas the heat generation amount becomes small when a white image is projected. Therefore, the heat generation amount significantly varies depending on the image. In response to the variation, the heating amount of the heater 65 is increased when the heat generation amount of the video display element unit is small, whereas when the heat generation amount of the video display element unit is large, the heating amount is decreased.

The boiling promoting means 66 desirably includes, for example, a number of recessed shapes on the flow path as shown in FIG. 6. Thereby, the flow of the refrigerant becomes gentle inside the recessed shapes, very small bubble nuclei which occur at the beginning of start of boiling grow to shift to the boiling state easily. Alternatively, compulsory vibration may be applied to the preliminary heating part by an ultrasound transducer to promote boiling.

The refrigerant in the two-phase state which is transported to the heat radiation part is condensed in the condenser 43 to be a liquid. The condensation heat which generates by condensation is released to air by the fan 44. The refrigerant which is in a liquid state again passes through the vapor-liquid separating part and circulated again by the pump.

According to the present embodiment, boiling is stabilized by providing the preliminary heating control means 46 between the pump 42 and the heat radiation part 40, and cooling performance can be enhanced.

Figures 7, 8:
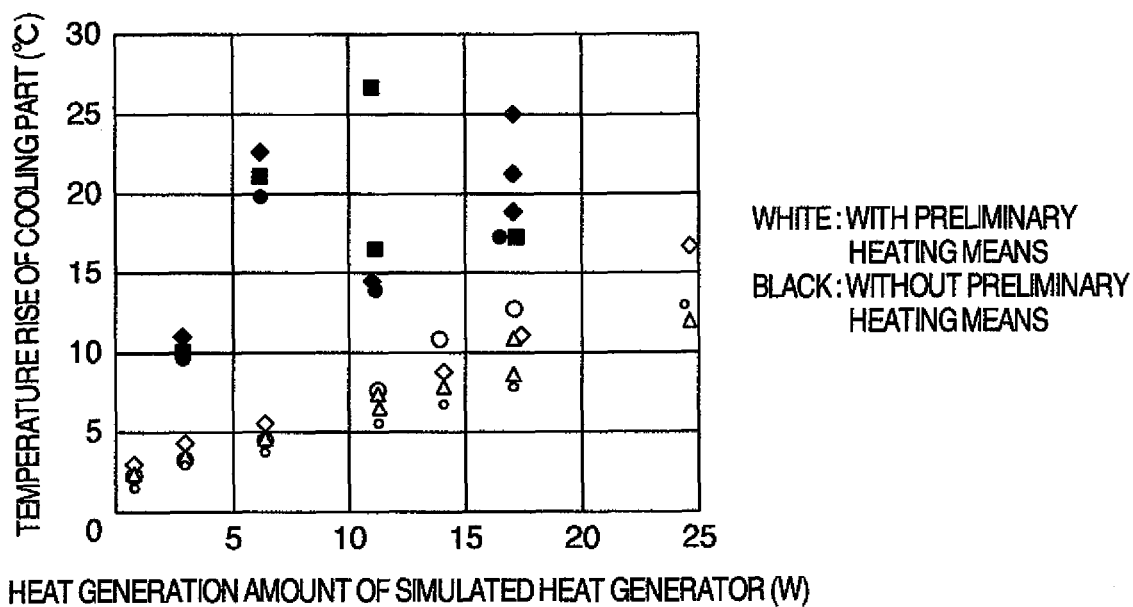
FIG. 7 is an experimental result showing an effect of the preliminary heating part.
FIG. 8 shows conditions of the experiment showing the effect of the preliminary heating part.

FIG. 7 is a graph showing an experimental result when a simulated heat generator is used instead of the video display element unit.

FIG. 8 is an experimental condition at that time.

In FIG. 7, FIG. 7 shows the relation of the heat generation amount of the simulated heat generator and the simulated heat generator temperature. At first, in the case where the preliminary heating means is not provided, the temperature abruptly rises when the heat generation amount of the simulated heat generator increases, as shown by the points painted in black in the graph. This is because when the heat generation amount is small, boiling does not occur, and cooling is performed by a single-phase liquid. Boiling starts to occur at the point of time when the heat generation amount reaches that of about 10 W, and the temperature rise with respect to the heat generation amount becomes gentle, but it is known that the temperature rise varies greatly. This is because boiling in the cooling part partially occurs.

In contrast with this, when the preliminary heating part is provided, boiling stably occurs in the cooling part. Therefore, temperature rise in the cooling part is entirely small though additional heat input by the preliminary heating part is provided, and variation in temperature is also small. More specifically, by making the boiling state in advance before the refrigerant flows into the cooling part by providing the preliminary heating means, the cooling part can be cooled more. Further, when the variation in temperature rise is small, and the heat generator in which the heat generation amount varies as the video display element unit is cooled, stable cooling performance can be realized.

Further, by controlling the heating amount of the preliminary heating part by providing the preliminary heating control means, the boiling state can be created with a small heating amount, and power consumption can be reduced. Further, since the preliminary heating part is at a low temperature especially at a time of start, time is required before boiling starts, but by temporarily increasing the input heat amount at the time of start, a boiling state can be created in a shorter time, the cooling performance is stabilized in a short time, and the cooling part can be prevented from being at a high temperature at the time of start. Further, the preliminary heating control means receives a signal showing the image state, which is being displayed, from the control circuit 37, and increases and decreases the heating amount while estimating the heat generation amount of the video display element unit, whereby the heating amount can be reduced while the cooling performance is stabilized. As a result, the power consumption can be reduced.

In addition, by further providing the preliminary heating part, vibration in the cooling part can be reduced. More specifically, in the phase change cooling system, vapor generates by boiling, and by abrupt volume change inside at that time, vibration occurs. Especially at the point of time when boiling of the refrigerant starts, in the process in which boiling, which partially starts, spreads entirely, or in the process in which the position and degree of partial boiling vary, strong vibration occurs.

In the case where the preliminary heating part is not provided, boiling starts in the cooling part, and therefore, the vibration which occurs by start of boiling is easily transmitted to the heat generator which is desired to be cooled. Especially since the video display element unit of the present embodiment enlarges the gathered light and projects it, even small vibration in the video display element unit causes vibration of images and out-of-color registration among red light, green light and blue light, and gives an adverse effect. By providing the preliminary heating part, vibration due to start of boiling occurs in the preliminary heating part, and therefore, vibration of the cooling part located at the position away from the preliminary heating part is reduced. Especially in the case of the present embodiment, vibration and out-of-color registration of images accompanying the vibration of the video display element unit can be reduced.

Further, by providing the boiling promoting means in the preliminary heating part, a boiling state can be created by a smaller heat input amount of the heater, and power consumption can be reduced.

The pump 42 and the vapor-liquid separating part 45 are disposed at the upstream side of the condensing part, seen from the flow of cooling air, and thereby, the pump 42 and the vapor-liquid separating part 45 are cooled by relatively cold air before passing through the condensing part. If the pump 42 is exposed to a high temperature, boiling is likely to occur inside the pump. If boiling occurs inside the pump, the function of the pump reduces, and delivery cannot be performed in the worst case. The pump 42 and the vapor-liquid separating part 45 are disposed at the upstream side from the condensing part seen from the flow of the cooling air, whereby the pump 42 can be kept at a relatively low temperature, occurrence of vapor inside the pump is restrained, and stable delivery can be realized.

Next, a phase change cooling system according to another embodiment and electronic equipment including the phase change cooling system will be described with FIG. 9. The electronic equipment in the present embodiment is the same projective type liquid crystal projector as that of the above described embodiment.

Figure 9:
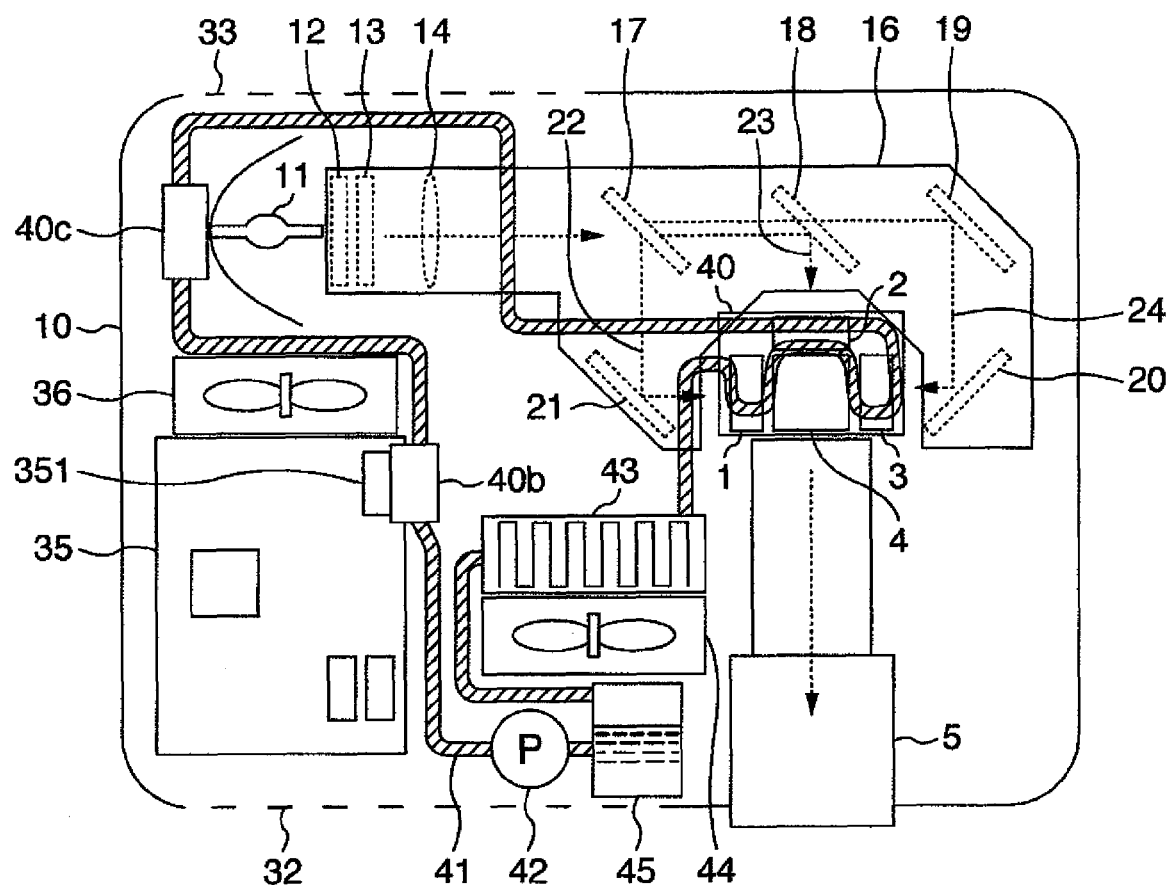
FIG. 9 is a schematic configuration diagram of a projective type video projector according to one embodiment of the present invention.

FIG. 9 is a schematic configuration diagram of the projective type liquid crystal projector in the present embodiment seen from above.

In FIG. 9, the present embodiment has the configuration similar to the embodiment shown in FIG. 1 except for the constitution in which the preliminary heating means is not provided and the configuration in which in addition to the heat radiation part 40 which cools the video display element unit, a heat radiation part 40b thermally connected to a power supply component 351 for cooling the power supply component 351 on the power supply unit 35, and a heat radiation part 40c, which is thermally connected to the light source lamp 11 in order to cooling the liquid source lamp 11, are provided. The heat radiation part 40b, the heat radiation part 40c and the heat radiation part 40 are connected in series in sequence by the refrigerant piping 41, and the heat radiation part 40 which cools the video display element unit is disposed at a downstream side from the heat radiation parts 40b and 40c with respect to the delivery direction of the refrigerant.

The video display element unit shown in the present embodiment is configured by the liquid crystal panel, incident polarizing plate and the radiant polarizing plate. An organic material is used for a polarizing film which is bonded onto the liquid crystal panel, incident polarizing plate and radiant polarizing plate, and therefore, when the video display element unit is at a high temperature of about 70 to 80° C., reduction in the optical characteristics and service life is caused. In contrast with this, the power supply component 351 is, for example, a regulator which converts an AC power supplied to the power supply unit into a direct current at a predetermined voltage, and such a power component is usually allowed to perform operation at about 125 to 150° C. Further, a mercury lamp which is used for a light source lamp can operate at 150° C. or higher. Specifically, in the present embodiment, in cooling a plurality of components or units, the heat radiation part 40 of the video display element unit of which operation allowing temperature is relatively low is disposed at a downstream side from the heat radiation part 40b and the heat radiation part 40c.

By the pump 42, the liquid refrigerant is delivered to the heat radiation part 40b for cooling the power supply component 351, first. The power supply component 351 is, for example, a regulator which converts AC power to be supplied to the power supply unit into a direct current at a predetermined voltage. The liquid refrigerant which flows into the heat radiation part 40b is heated by the heat generated by the power supply component 351, and starts to boil to be in a two-phase flow state in which part of it becomes vapor. At this time, the power supply component 351 is cooled by the refrigerant absorbing heat as heat of vaporization when the refrigerant boils and becomes vapor. The refrigerant which is in a two-phase state is transported to the heat radiation part 40c next. The liquid refrigerant which flows into the heat radiation part 40c is heated by the heat generated by the light source lamp 11, further boils, and cools the liquid source lamp 11. Next, the refrigerant is transported to the radiation part 40 to cool the video display element unit.

The refrigerant in the two-phase state which is transported to the heat radiation part becomes a liquid by being condensed in the condenser 43. The condensation heat which generates by condensation is released to air by the fan 44. The refrigerant which becomes a liquid again passes through the vapor-liquid separating part and circulated again by the pump.

Since in the heat radiation part 40b at the most upstream side, the liquid refrigerant enters and boiling starts, partial boiling occurs, boiling does not become stable, and cooling performance is low. However, the operation allowing temperature of the power supply component 351 is high, and therefore, slightly bad cooling performance can be allowed. Further, in the present embodiment, the fan which cools the power supply unit by air is originally provided, and therefore, the power supply component can be sufficiently cooled to the allowable temperature. Alternatively, if the effect of air cooling is high and the temperature of the power supply component 351 becomes too low conversely, heat which is required for start of boiling is not sometimes supplied to the liquid refrigerant which flows into the heat radiation part 40b. In such a case, the heat radiation part 40b may be connected to the power supply component with a large heat generation amount, for example, or the periphery of the power supply component and the heat radiation part 40b may be thermally insulated so as not to be excessively cooled by the effect of air cooling.

In the heat radiation part 40c which cools the light source lamp 11 and the heat radiation part 40 which cools the video display element unit, the refrigerant which flows into them is already in the boiling state in the heat radiation part 40b, and therefore, stable cooling performance is obtained.

Further in the present embodiment, the heat radiation part 40b which cools the power supply component 351 and the heat radiation part 40c for cooling the light source lamp are provided, but only any one of them may be provided. In such a case, the refrigerant which is already in the boiling state flows into the heat radiation part 40 of the video display element unit, and therefore, stable cooling performance can be obtained in the heat radiation part 40.

According to the present embodiment, by including a plurality of cooling parts in at least two spots, not only a plurality of heat generators can be cooled, but also the heat generator which is disposed at the downstream side along the delivery direction of the refrigerant can be cooled more. In the present embodiment, when only the cooling part for cooling the video display element unit is included, the liquid refrigerant flows into the cooling part of the video display element unit. Therefore, the boiling state partially occurs, and cooling performance is not stabilized. In contrast with this, by adding the cooling parts for the power supply component, the light source and the like, not only a plurality of components and units can be cooled, but also cooling performance itself of the video display element unit is stabilized and enhanced.

Further, in cooling a plurality of components and units, the heat radiation part 40 of the video display element unit of which operation allowing temperature is relatively low is disposed at the downstream side from the heat radiation part 40b and the heat radiation part 40c. Since the refrigerant already in the boiling state flows into the heat radiation part 40, stable cooling performance can be obtained in the heat radiation part 40 which cools the video display element unit of which operation allowing temperature is low. As compared with the embodiment shown in FIG. 1, heat input by the heater is not performed, and therefore, power consumption can be reduced. Further, as compared with the same embodiment shown in FIG. 1, the fan 36 which cools the power supply unit and the light source lamp can be made compact since the power supply component 351 and the light source lamp are cooled by the phase change cooling system. Further, as in the embodiment shown in FIG. 1, vibration to the video display element unit is reduced, and vibration and out-of-color registration of an image can be reduced.

Next, a phase change cooling system according to another embodiment and electronic equipment including the phase change cooling system will be described.

The electronic equipment in the present embodiment is a computer having a CPU which performs arithmetic processing and a chip set on a mother board.

Figure 10:
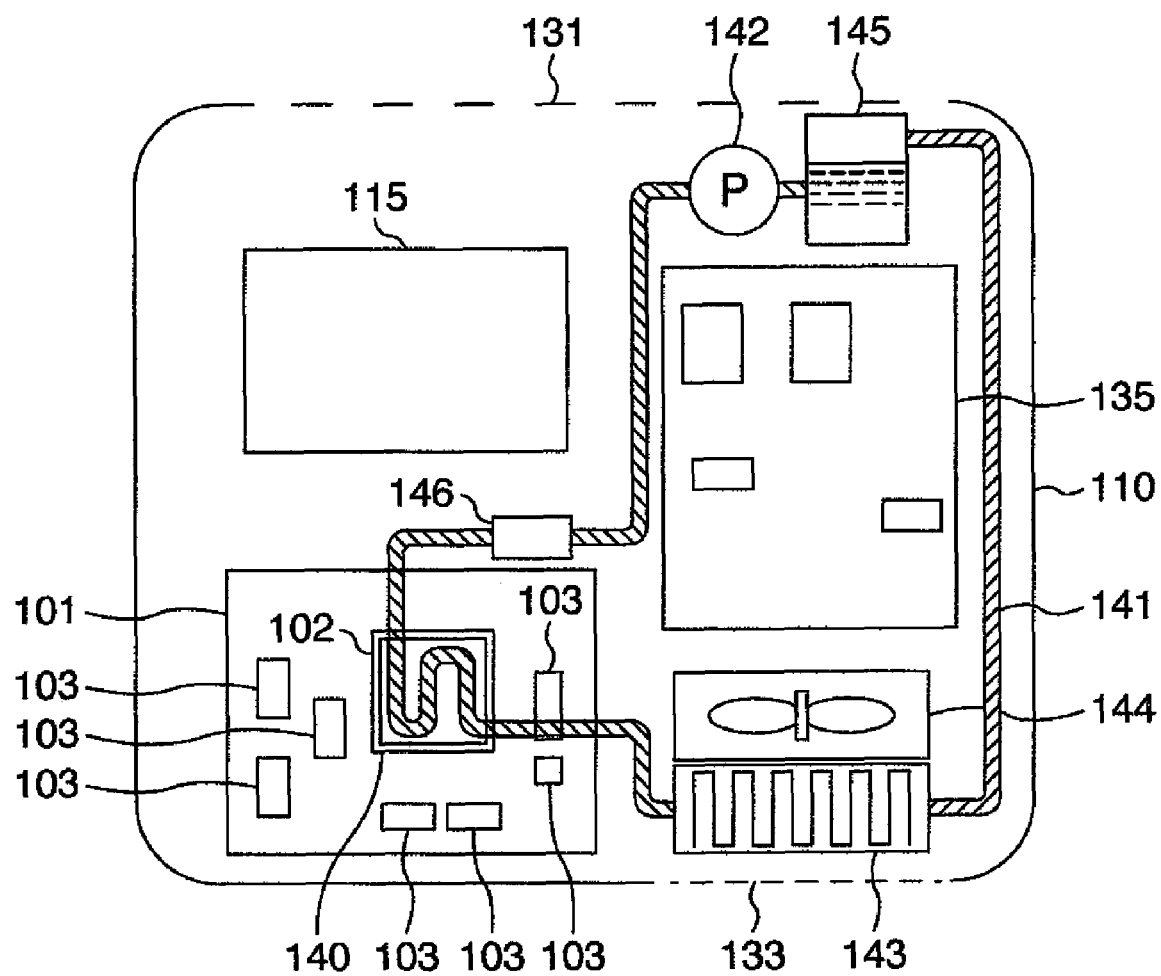
FIG. 10 is a schematic configuration diagram of a computer according to one embodiment of the present invention.

FIG. 10 is a schematic configuration diagram of a computer in the present embodiment.

In FIG. 10, a mother board 101 loaded with a CPU 102 which performs arithmetic processing and a necessary chip set 103, and a power supply unit 135 for supplying a power supply to the mother board 101, a hard disk 115, other components and modules are provided inside a casing 110.

In the present embodiment, as in the embodiment shown in FIG. 1, a phase change cooling system configured by a pump 142, a refrigerant piping 141, a preliminary heating part 146, a cooling part 140, a condenser 143, a vapor-liquid separating part 145 and a fan 144 is provided inside the casing 110. Further, by operation of the fan 144, air flows in from an intake port 131, and flows on a refrigerant drive part constituted of the pump 142, the vapor-liquid separating part 145, the hard disk 115, and the power supply unit 135 while cooling them, and thereafter, the air cools the condenser 43 shown in FIG. 9 to be exhausted from an exhaust port 133. Specifically, the pump 42 and the vapor-liquid separating part 45 are disposed at the upstream side from the condensing part seen from the flow of the cooling air.

Figure 11:
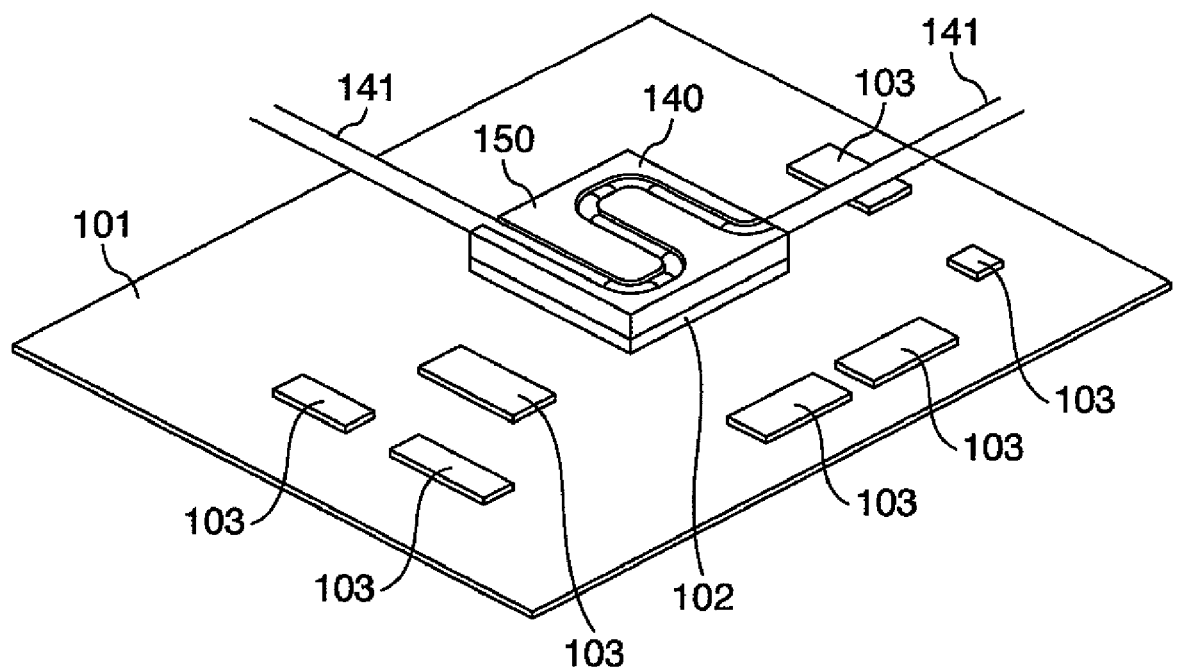
FIG. 11 is a perspective view of a CPU cooling part and its periphery according to one embodiment of the present invention.

FIG. 11 is a perspective view of the cooling part 140 and its periphery.

In FIG. 11, the cooling part 140 is thermally connected to an upper portion of the CPU on the mother board 101. Further, as in the embodiment shown in FIG. 1, the refrigerant piping 141 is buried in a groove 150 provided in the cooling part 140, and the heat generating in the CPU is transmitted to the refrigerant piping 141 by the cooling part 140 by heat conduction. In the present embodiment, in the cooling part 140, the refrigerant piping 141 is buried in the groove 150, but a flow path in which the refrigerant flows may be formed inside the cooling part 140 itself, for example.

The configuration of the phase change cooling system of the present embodiment is as in the embodiment shown in FIG. 1, and the liquid refrigerant is delivered to the preliminary heating part 146 by the pump 142. The heating amount of the preliminary heating part 146 is controlled by preliminary heating control means (not illustrated). The refrigerant which starts boiling in the preliminary heating part 146 and is in a two-phase state is fed to the cooling part 140, receives heat generating from the CPU, further boils and cools the CPU. The refrigerant in the two-phase state which is transported to the radiation part is condensed by the condenser 143 to be a liquid. The condensation heat which occurs by condensation is released to air by the fan 144. The refrigerant which becomes a liquid again passes through the vapor-liquid separating part and is circulated again by the pump.

According to the present embodiment, boiling is stabilized first by providing the preliminary heating control means 146 between the pump 142 and the cooling part 140 as in the embodiment shown in FIG. 1, and cooling performance can be enhanced. Especially in the CPU of the computer as shown in the present embodiment, the heat generation amount varies greatly due to variation in the arithmetic operation amount. In contrast with this, as shown in the experimental result of FIG. 7, by providing the preliminary heating means and creating the boiling state in advance before the refrigerant flows into the cooling part, boiling is stabilized and variation in temperature increase becomes small. Therefore, stable cooling performance of the CPU can be realized.

Furthermore, by providing the preliminary heating part, variation in the cooling part can be reduced. The CPU of the present embodiment is especially mounted on the mother board, and since the CPU of recent years is electrically connected to the mother board, the number of pins provided on the back surface of the CPU becomes very large, and they are usually connected to the mother board by soldering by very small solder balls. Therefore, when vibration is applied to the CPU, a crack occurs in the interface of the solder balls, and electrical continuity is not likely to be provided in the worst case. Accordingly, by providing the preliminary heating part, vibration due to start of boiling occurs in the preliminary heating part, and vibration of the cooling part which is located at the position away from the preliminary heating part is reduced. Therefore, mounting reliability of the CPU can be enhanced.

Next, a phase change cooling system according to another embodiment and electronic equipment including the phase change cooling system will be described.

The electronic equipment in the present embodiment is a computer having a CPU which performs arithmetic processing and a chip set.

Figure 12:
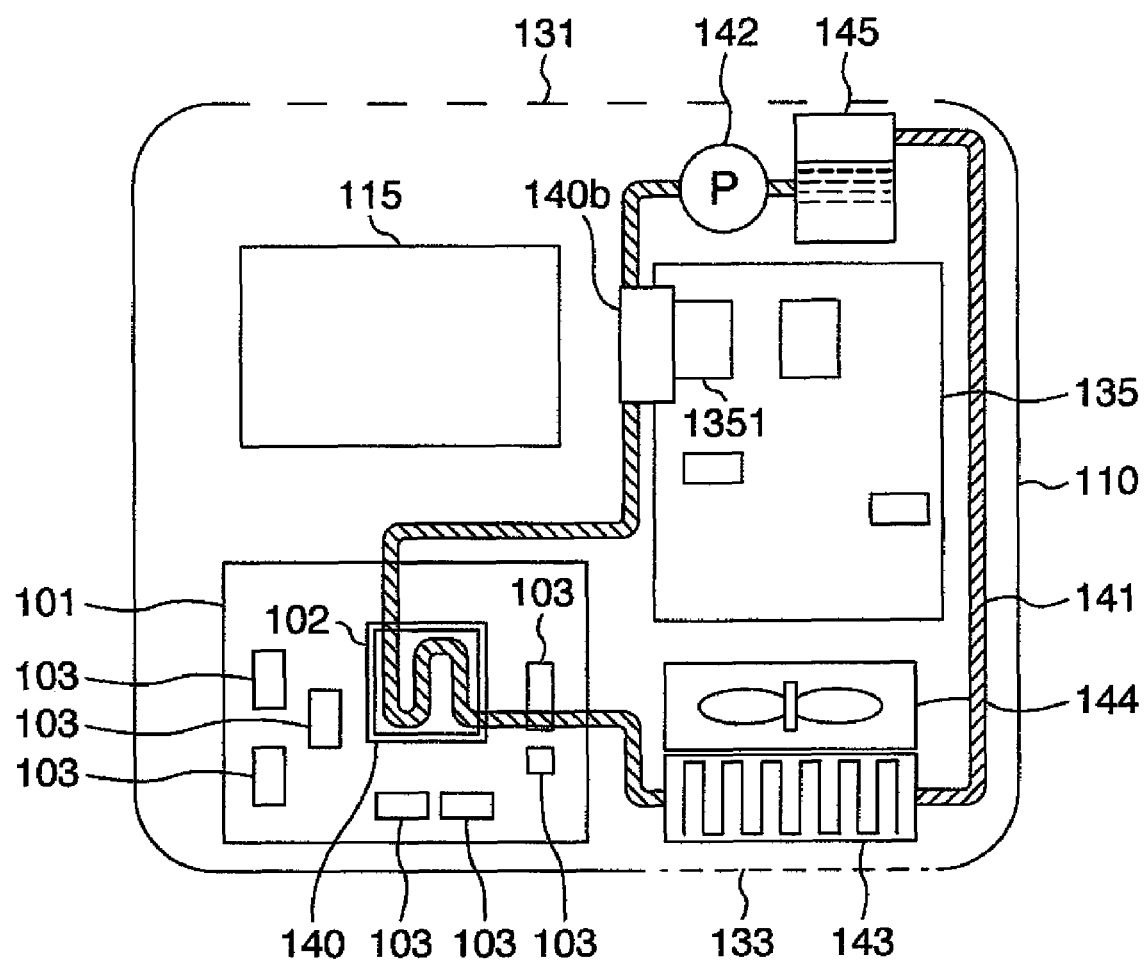
FIG. 12 is a schematic configuration diagram of a computer according to one embodiment of the present invention.

FIG. 12 is a schematic configuration diagram of the computer in the present embodiment.

In FIG. 12, the present embodiment has a similar configuration to the embodiment shown in FIG. 10 except for the constitution in which the preliminary heating means is not provided, and a cooling part 140b, which is thermally connected to a power supply component 1351 for cooling the power supply component 1351 on the power supply unit 135, is provided in addition to the cooling part 140 which cools the CPU.

The cooling part 140*b* and the heat radiation part 140 are connected in series in sequence by the refrigerant piping 141, and the cooling part 140 which cools the CPU is disposed at a downstream side from the cooling part 140*b*. The CPU usually guarantees to operate up to about 85° C. The allowable temperature is sometimes higher than this, but in the CPUs of recent years, temperature becomes a limiting factor with increase in the heat generation amount, and when the temperature becomes high, the CPUs are sometimes operated by reducing the operation frequency or shifting the operation mode to a power saving mode. From this point of view, the lower the allowable operation temperature, the more desirable.

In contrast with this, the power supply component 1351 is, for example, a regulator which converts AC power to be supplied to the power supply unit into a direct current at a predetermined voltage, and such a power supply component usually guarantees to operate at about 125° to 150° C. Specifically, in the present embodiment, the cooling part 140 of the CPU of which operation allowing temperature is relatively low is disposed at the downstream side from the cooling part 140*b* in cooling a plurality components or units.

By the pump 42, the liquid refrigerant is delivered to the cooling part 140*b* for cooling the power supply component 1351 first. The power supply component 1351 is, for example, a regulator which converts AC power to be supplied to the power supply unit into a direct current at a predetermined voltage. The liquid refrigerant which flows into the cooling part 140*b* is heated by the heat generated by the power supply component 1351, and starts to boil to be in a two-phase flow state in which a part of it becomes vapor. At this time, the power supply component 1351 is cooled by absorbing heat as heat of vaporization when the refrigerant boils and becomes vapor. The refrigerant which is in the two-phase state is transported to the cooling part 140 to cool the CPU.

The refrigerant in the two-phase state which is transported to the heat radiation part is condensed in the condenser 143 to be a liquid. The condensation heat which occurs due to condensation is released into air by the fan 144. The refrigerant which becomes a liquid again passes through the vapor-liquid separating part and is circulated again by the pump.

Since the liquid refrigerant flows in and boiling starts in the cooling part 140*b* at the upstream side, partial boiling occurs, boiling is not stabilized, and cooling performance is low. However, the operation allowing temperature of the power supply component 1351 is high, and therefore, even if the cooling performance is a little low, it can be allowed. Further, in the present embodiment, the fan which cools the power supply unit is originally provided, and therefore, the power supply component can be sufficiently cooled to an allowable temperature.

In the present embodiment, the fan which air-cools the power supply unit is originally provided, and therefore, the power supply component can be sufficiently cooled to sufficient allowable temperature. Alternatively, when the effect of air cooling is high, and the temperature of the power supply component 1351 becomes too low, the heat required for start of boiling is not sometimes supplied to the liquid refrigerant which flows into the cooling part 140*b*. In such a case, the cooling part 140*b* is connected to the power supply component which generates a larger heat amount, for example, or the periphery of the power supply component and the cooling part 140*b* may be thermally insulated so as not to be excessively cooled by the effect of air cooling. In the cooling part 140 which cools the CPU, the refrigerant which flows in is already in the boiling state in the cooling part 140*b*, and therefore, stable cooling performance is obtained.

According to the present embodiment, a plurality of cooling parts are included in at least two spots, and therefore, not only a plurality of heat generators can be cooled, but also the heat generator disposed at the downstream side along the delivery direction of the refrigerant can be cooled more. In the present embodiment, when only the cooling part for cooling the CPU is included, the liquid refrigerant flows into the cooling part of the CPU. Therefore, a boiling state partially occurs, and the cooling performance is not stable. In contrast with this, by adding the cooling parts for the power supply component, the light source and the like, not only a plurality of components and units can be cooled, but also the cooling performance itself of the CPU is stabilized and enhanced.

Further, in cooling a plurality of components and units, the cooling part 140 for the CPU of which operation allowing temperature is relatively low is disposed at the downstream side from the cooling part 140*b*. Since the refrigerant which is already in a boiling state flows into the cooling part 140, stable cooling performance can be obtained in the cooling part 140 which cools the CPU of which operation allowing temperature is low. Further, as compared with the embodiment shown in FIG. 10, heat input by the heater is not performed, and therefore, power consumption can be reduced.

Further, vibration to the CPU is reduced as in the embodiment shown in FIG. 10, and mounting reliability can be enhanced.

As described above, according to the present invention, the electronic equipment which includes stable cooling performance and reduces the influence of vibration which occurs due to phase change can be realized by providing the preliminary heating means, or including a plurality of cooling parts, and by especially disposing a plurality of cooling parts properly along the delivery direction. The cooling performance is especially stabilized, and the influence which vibration accompanying phase change of boiling and condensation gives to the electronic equipment is reduced.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A cooling system for cooling a heat generating element, comprising,
   a cooling part thermally connected to the heat generating component and containing a refrigerant to be heated to its boiling by a heat energy generated by the heat generating component so that the heat energy is absorbed by the refrigerant,
   a heat radiator for discharging the heat energy absorbed by the refrigerant so that the refrigerant is condensed,
   a refrigerant driver for urging toward the cooling part the refrigerant condensed by the heat radiator, and
   a pipe arrangement for fluidal communication among the cooling part, heat radiator and refrigerant driver,
   wherein the system further comprises a heater arranged to heat the refrigerant flowing from the refrigerant driver to the cooling part,
   wherein the heater includes a heat controller to adjust another heat energy generated by the heater to be applied to the refrigerant in accordance with a condition of the heat generating component.

2. The cooling system according to claim 1, wherein the heater increases the another heat energy in response to an operation start of the heat generating component.

3. A cooling system for cooling a heat generating element, comprising,
- a cooling part thermally connected to the heat generating component and containing a refrigerant to be heated to its boiling by a heat energy generated by the heat generating component so that the heat energy is absorbed by the refrigerant,
- a heat radiator for discharging the heat energy absorbed by the refrigerant so that the refrigerant is condensed,
- a refrigerant driver for urging toward the cooling part the refrigerant condensed by the heat radiator, and
- a pipe arrangement for fluidal communication among the cooling part, heat radiator and refrigerant driver,
- wherein the system further comprises a heater arranged to heat the refrigerant flowing from the refrigerant driver to the cooling part,
- wherein the heat generating component is an image projector of transmission type including an image display unit having a light source and at least one image display element for at least one of modulating, reflecting and absorbing a light with heat generation, and the image display unit is thermally connected to the cooling part to be cooled.

4. The cooling system according to claim 1, wherein the heat generating component includes a computer having a CPU and a chip set mounted on a mother board, and the CPU is thermally connected to the cooling part to be cooled.

5. A cooling system for cooling at least two heat generating components, comprising,
- at least two cooling parts thermally connected to the heat generating components respectively, and each of the cooling parts containing a refrigerant to be heated to its boiling by a heat energy generated by respective one of the heat generating components so that the heat energy is absorbed by the refrigerant,
- a heat radiator for discharging the heat energy absorbed by the refrigerant so that the refrigerant is condensed,
- a refrigerant driver for urging toward the cooling parts the refrigerant condensed by the heat radiator, and
- a pipe arrangement for fluidal communication among the cooling parts, heat radiator and refrigerant driver,
- wherein the system further comprises a heater arranged to heat the refrigerant flowing from the refrigerant driver to the cooling parts.

6. The cooling system according to claim 5, wherein one of the heat generating components having a relatively lower permissible operating temperature in comparison with that of the other one of the heat generating components is thermally connected to one of the cooling parts arranged at a relatively downstream side with respect to the other one of the cooling parts in a flow direction of the refrigerant from the refrigerant driver.

7. The cooling system according to claim 5, wherein the heat generating components form at least partially an image projector of transmission type including an electric power source unit and at least one image display element unit for at least one of modulating, reflecting and absorbing a light generated by a light source with heat generation, one of the cooling parts is thermally connected to the image display unit to be cooled, and the other one of the cooling parts is thermally connected to one of the light source and the electric power source unit to be cooled.

8. The cooling system according to claim 6, wherein the heat generating component includes an image display element unit for at least one of modulating, reflecting and absorbing a light, and the one of the cooling parts is thermally connected to the image display element unit.

9. The cooling system according to claim 5, wherein the heat generating components form at least partially a computer having an electric power source unit, and a combination of a CPU and a chip set mounted on a mother board, and the CPU is thermally connected to one of the cooling parts arranged at a relatively downstream side with respect to the other one of the cooling parts in a flow direction of the refrigerant from the refrigerant driver.

* * * * *